United States Patent [19]
Gutsell et al.

[11] Patent Number: 5,672,929
[45] Date of Patent: Sep. 30, 1997

[54] MOVING SENSOR USING MECHANICAL VIBRATIONS

[75] Inventors: Graham Scott Gutsell; Peter John Taylor, both of Cambridge, United Kingdom

[73] Assignee: The Technology Partnership Public Limited Company, Hertfordshire, United Kingdom

[21] Appl. No.: 676,406

[22] Filed: Jul. 8, 1996

Related U.S. Application Data

[63] Continuation of Ser. No. 295,844, filed as PCT/GB93/00439, Mar. 3, 1993, published as WO93/17871, Sep. 16, 1993, abandoned.

[30] Foreign Application Priority Data

Mar. 3, 1992 [GB] United Kingdom .......... 9204592

[51] Int. Cl.$^6$ .................................................. H01L 41/08
[52] U.S. Cl. ........................................ 310/319; 310/338
[58] Field of Search ............................ 310/319, 328, 310/338, 339

[56] References Cited

U.S. PATENT DOCUMENTS

| | | | |
|---|---|---|---|
| 1,717,263 | 6/1929 | Rice | 310/339 |
| 2,728,222 | 12/1955 | Becker et al. | 73/105 |
| 3,374,663 | 3/1968 | Morris | 73/71.2 |
| 3,548,116 | 12/1970 | Schafft | 179/110 |
| 3,613,065 | 10/1971 | Lindemann et al. | 340/259 |
| 3,710,040 | 1/1973 | Swinehart | 179/110 A |
| 3,924,456 | 12/1975 | Vahaviolos | 73/88 R |
| 4,310,913 | 1/1982 | Miller | 369/43 |
| 4,433,386 | 2/1984 | Este | 364/563 |
| 4,602,359 | 7/1986 | Palmer | 369/58 |
| 4,776,212 | 10/1988 | Parsons et al. | 73/105 |
| 5,222,034 | 6/1993 | Shelton et al. | 364/559 |
| 5,357,105 | 10/1994 | Harp et al. | 250/234 |

FOREIGN PATENT DOCUMENTS 0660125   5/1979   U.S.S.R. .................. 310/328

*Primary Examiner*—Thomas M. Dogherty
*Attorney, Agent, or Firm*—Watson Cole Stevens Davis, P.L.L.C.

[57] ABSTRACT

A movement sensor (40) for a process device has a sensor tip (42); means (41) for transmitting the vibrations from the sensor tip to a transducer means (43), the transducer means electrically detecting the resulting vibrations as movement occurs and producing an output signal. Means (70) can be provided for filtering the output signal below and above respective predetermined frequencies and producing a movement detection signal when the output signal lies between the predetermined frequencies.

14 Claims, 4 Drawing Sheets

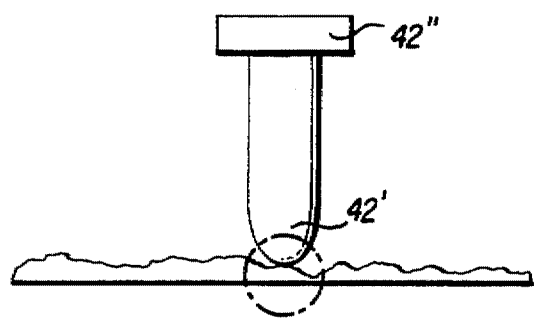
FIG. 6A
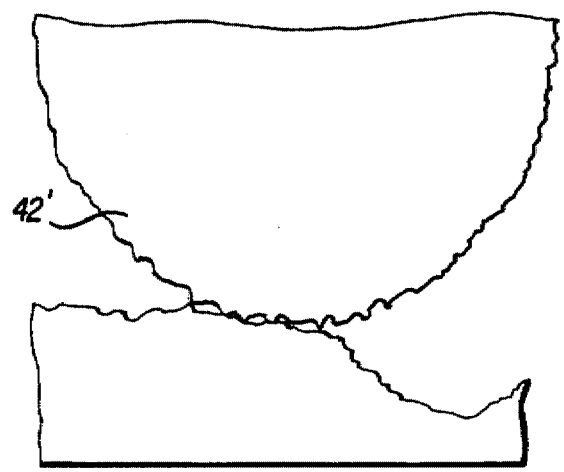
FIG. 6B
FIG. 8
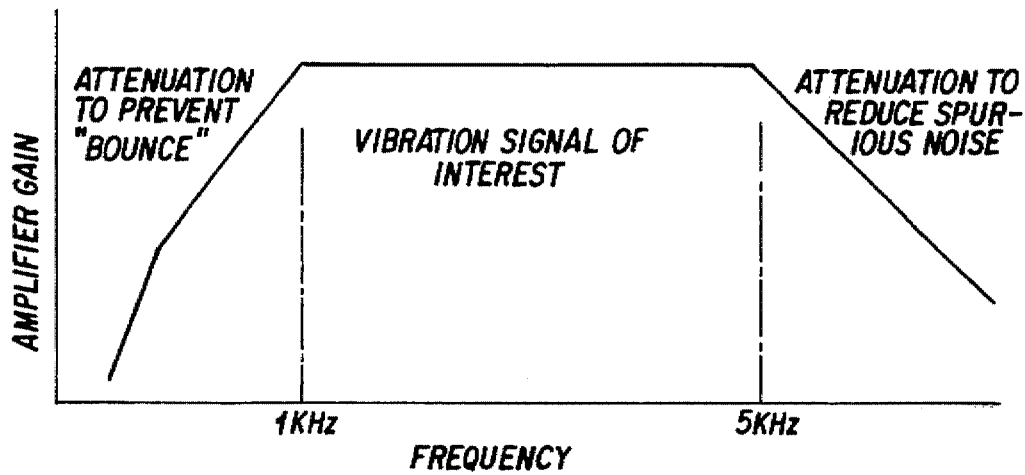

MOVING SENSOR USING MECHANICAL VIBRATIONS

This is a Continuation of application Ser. No. 08/295, 844, filed as PCT/GB93/00439, Mar. 3, 1993, published as WO93/17871, Sep. 16, 1993, now abandoned.

This invention relates to a method of detecting the movement of an active device relative to a surface, in order to control the operation of the device to process the surface in some way. A particular field of application is for controlling a range of hand held devices used for writing, scanning, coating, spraying, heating, etc..

There are many applications where it is necessary to bring some device up to a surface, which cannot be prepared in any way beforehand, and to move the device over the surface whilst treating or sensing the surface in some way. Examples are:

writing or printing on the surface by depositing ink spraying some material onto the surface using an optical sensor to read existing marks on the surface, such as bar codes or letters heating the surface with a focused beam of infra-red radiation writing or reading a magnetic pattern with an electromagnetic head.

A particular example is in the context of hand held printers.

In the general applications it is necessary to generate a signal to control the process to treat the desired region of the surface in the correct way.

The basic control function that is required is to turn the process on when the device is moving across the surface, and in contact with it. In some cases, as in a writing instrument, it may be necessary to signal that contact has been made, even if there is no transverse movement.

In the prior art various techniques have been used to generate the control signal. The simplest approach in a hand-held device is to provide a finger operated switch, as in the ink jet pen described in U.S. Pat. No. 4,746,936. The user has to decide exactly when to turn the device on and off. In practice this is inconvenient to use, and does not provide accurate enough control.

Many existing devices, e.g. as described in U.S. Pat. No. 4,168,533 have a wheel or belt which is moved by friction as the device travels across the surface. The movement of the wheel or belt is then detected by some additional sensor system. This approach can provide good results in many applications, but has a number of disadvantages:

the low reliability of a moving parts mechanism high component and assembly costs large size and inconvenient shape single direction operation.

The object of the current invention is to provide a sensor which overcomes the disadvantages of the prior art to offer the following:

solid state operation, and reliability small size low cost omni-directional operation convenient shapes and formats.

The present invention provides a sensor device which is sensitive to the vibrations generated by the movement of one surface, that of the part of the process device touching the surface being treated, in contact with another surface, that being treated.

According to the present invention there is provided a movement sensor for a process device, comprising a sensor tip;

means for transmitting the vibrations from the sensor tip to a transducer means, the transducer means electrically detecting the resulting vibrations as movement occurs and producing an output signal.

Preferably, the movement sensor comprises means for filtering the output signal below and above respective predetermined frequencies and producing a movement detection signal when the output signal lies between the predetermined frequencies.

Although in the presently preferred embodiments of the invention, the transducer is a piezoelectric device, it is envisaged that the vibrations may alternatively be detected by a microphone constituting the transducer, and in which case, an accoustic waveguide may be used to direct the air vibrations to the microphone from the supporting means.

The device finds particular application in a hand-held writing instrument as described in our co-pending application, reference 90/4361/03, but may also be used in a wide range of other devices where movement sensing is important. For example, the device may may be used to sense movement of a pen across the paper surface in an X-Y plotter used for preparing drawings and the like, or may be used to detect paper movement in devices such as printers, fax machines, photocopiers or the like, in order to provide a fast way of sensing paper jamming.

Three examples of sensors according to the invention will now be described with reference to the accompanying drawings, in which:

FIGS. 6A & 6B are diagrammatic side views of part of the third sensor shown engaged with a sheet of paper, FIG. 6B being on a much enlarged scale;

In the first example, a stylus or sensor tip 1 is mounted on a cantilever 2 mounted on a laser writing device. A piezoelectric strain gauge 3 is mounted on the cantilever 2 and detects vibrations generated by movement of the stylus 1 over the writing surface.

The principle of operation is as follows:

When the process device is not in contact with the surface the transducer receives no vibrations, and as a result, the process device can be controlled to be off.

When the stylus 1 touches a writing surface, a vibration impulse is transmitted to the transducer. This provides a signal that contact has been made. This can be used to turn on the process device instantaneously.

If there is no transverse movement, no further vibrations are generated, and the process device is controlled off.

When there is transverse movement, in any direction, vibrations are generated and detected, thus controlling the process device on, to process the surface over which the device is moving.

Figure 1:
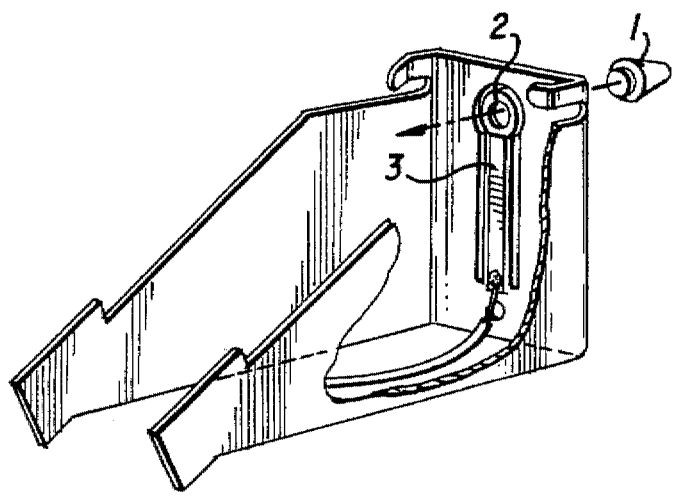
FIG. 1 is an exploded view of a first example.
Figure 2:
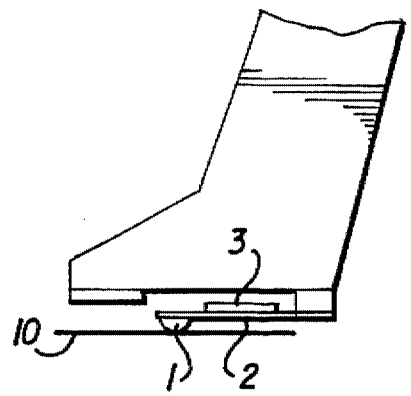
FIG. 2 is a side view of a modification of the first example.

The example of FIGS. 1 and 2 shows a sensor applied to a hand held marker pen being operated in the way described below in connection with the third example (see also our copending application, reference 90/4361/03).

The tip of the sensor comprising a stylus 1 connected to a cantilever and makes contact with the writing surface 10, so that vibrations are produced when there is relative movement. The vibration is a result of factors such as the roughness of the writing surface and the friction between the surface and the stylus. The vibration signal can be enhanced by the choice of stylus material, its surface finish, and its geometry.

The strain gauge, preferably a piezo-electric ceramic transducer 3, monitors the compliant region of the stylus assembly. The associated electronic signal processing is arranged to distinguish between sensor signals caused by writing, and spurious signals due to other causes such as airborne noise, and vibrations generated in the body of the marker, e.g. by tapping it. The level and frequency content of the vibrations can be used as discriminating features.

It is also possible to derive a velocity signal from the vibration signal. For example, as the velocity of the pen increases, so does the mean frequency of the vibrations and the total vibration energy. Suitable signal processing and calibration allows the marking process to be controlled to take account of velocity variations. When marks are made by pulses of laser energy, the pulse repetition rate can be increased at high velocities, to keep the distance between pulses, and the marks, more consistent. Velocity detecting means 53, such as an RMS power meter shown in FIG. 5B, may be coupled to the transducer 43 to derive the velocity signal.

Figure 3:
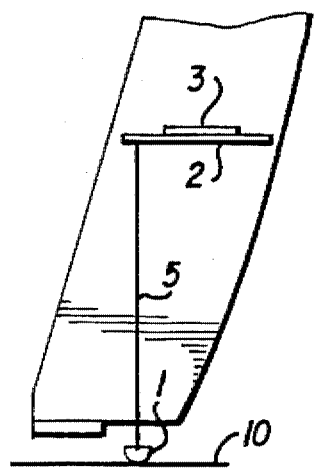
FIG. 3 is a side view of a second example.
Figure 4:
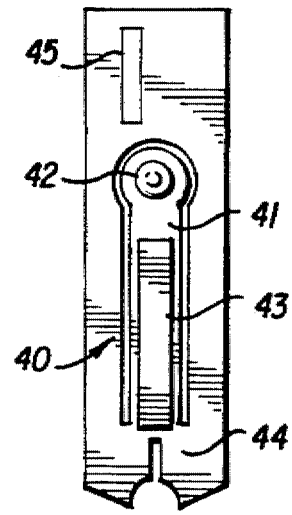
FIG. 4 is a plan view of a third sensor assembly.

In a second example, shown in FIG. 3, the stylus 1 is mounted on a shaft 5 which, in turn is connected to a cantilever 2, on which is mounted a transducer 3 as in the first example.

In a further example (not shown) there is no specific component to provide the support and vibration generation means, but rather, the process device is designed so that if its active element is in a suitable position to process the surface, any part of the casing of the process device will function to support the device and generate vibrations.

The transducer may be a conventional audio microphone 45 mounted where there is an adequate pathway 47 for transmission of sound 49 to it from the working surface. Alternatively, an acoustic waveguide may 51 may be located in the pathway 47 to carry the sound to the microphone 45.

When vibrations are generated by movement of the casing over the surface, some of this vibrational energy can travel through the air to the transducer.

There are many other possible embodiments of this invention, not restricted to the above fields of application.

The third example described with reference to and illustrated in FIGS. 4 to 8 is an example as used in a marker pen described and claimed in our copending application reference 90/4361/03.

It is worthwhile considering the theory before describing the sensor actually used in the third embodiment.

The speed of sound in steel is roughly 6000 m/s. At the current maximum sensor operating frequency of 20 kHz, therefore the wavelength is 250 mm, much longer than the sensor (10 mm).

This means that in modelling the behaviour of the device, we can assume static behaviour. The calculated "tuning fork" resonance frequency of a steel beam is:

$$f = \frac{1}{2\pi} \cdot \frac{6EI}{\left(M_1 + \frac{M_2}{2}\right)^3}$$

where $M_1$ is the tip mass $M_2$ the beam mass and I the cross-sectional area moment. For the current sensor this resonance frequency is $f=68$ kHz The design must not change in such a way as to bring the resonance frequency within the sensor passband, otherwise the sensor will be very sensitive to stray vibration.

The position of the neutral surface in relation to the glue line in a piezo-steel beam is given by the equation:

$$y = \frac{E_s d_s^2 - E_p d_p^2}{2(E_p d_p + E_s d_s)}$$

where $d_s$ is the steel thickness and $d_p$ the piezo thickness.

For a fixed maximum writing force, F, the energy stored within the piezo is maximised if the neutral surface is at the glue boundary. This also reduces the stress on the glue (in this case only shear forces act on the glue line). In this case $y=0$ so $$d_p = d_s \cdot E_s/E_p$$

The Young's modulus of steel is 200 GPa and that of PZT5 70 GPa. Therefore $$d_p = 1.7 \times d_s$$

The piezo thickness should therefore be around 850 µm for a 500 µm thick steel beam.

The maximum stress within the beam as at the support point, since the bending moment G, is maximum there for a force F applied at the tip. The piezo should therefore cover the support end of the beam.

It is reasonable to expect that a beam which is very flexible will detect large signals, for two reasons. Firstly, a stiff beam will crush paper height variations more readily, and secondly, since the work done on the piezo is the writing force (which is externally fixed) multiplied by the beam deflection, the energy transfer will be greater for a beam which gives greater deflection. Therefore the beam should be as narrow as possible. Practically, a 1 mm thick beam is at the limit of ready manufacture.

The beam will fail for maximum writing pressure if the shear force on the glue line exceeds the specified shear limit. The shear stress for a fixed load is constant down the length of the beam and is given by:

$$\text{Shear Stress} = \frac{3F}{4d_s w}$$

where $d_2$ is the steel thickness and w the beam width. Typical fail shear stress for most adhesives is around 50 MPa, hence for safe operation $$\frac{3F}{4d_s w} < 50 \times 10^6$$

The maximum force is F=3N, the width is w=1 mm and $d_s$=500 µm, so $$\frac{3F}{4d_r w} = 4.5 \times 10^{-6}$$

i.e. the applied shear stress is 1/10 the shear stress limit at maximum specified writing force.

Figure 5:
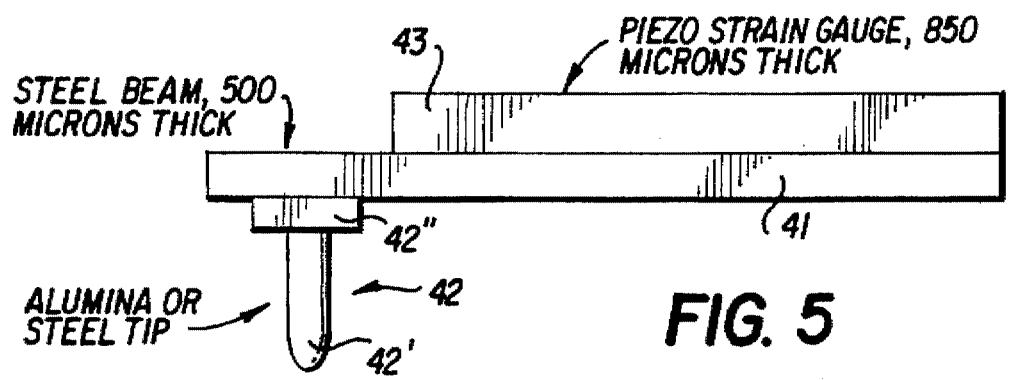
FIG. 5 is a diagrammatic partial side view of the third sensor assembly.
Figure 5A:
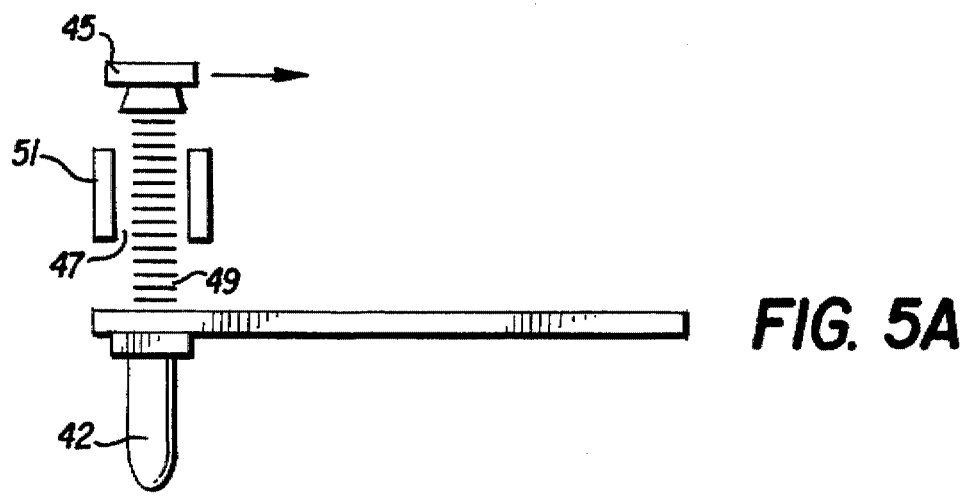
FIG. 5A is a diagrammatic view of a sensor assembly employing a microphone transducer and an acoustic waveguide.
Figure 5B:
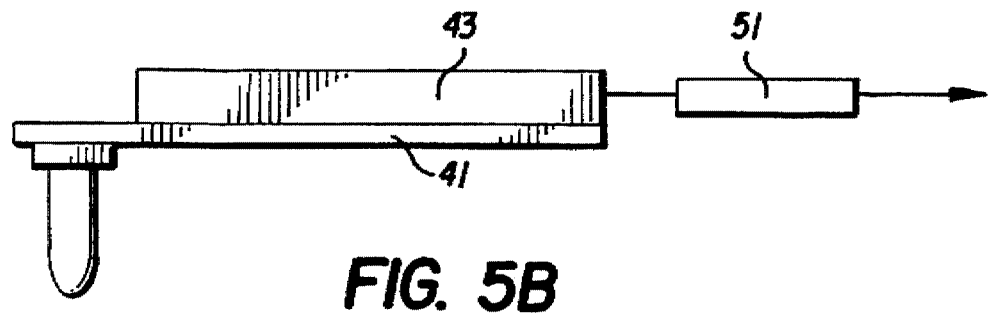
FIG. 5B is a diagrammatic view of a sensor assembly including means for determining a velocity signal.

The proposed beam structure as shown in FIG. 5.

The sensor tip has to be constructed of a hard material to prevent excessive wear. Alumina or sintered steel are the most probable materials. Given the material the surface structure may be tuned to alter the sensor characteristics. There are two critical parameters:

The 'feel' of the pen is important for market acceptance. The sensor must not feel rough as it runs over the paper.

The tip should have a surface structure which maximises the output signal.

The surface of paper consists of a mat of bound fibres. The typical fibre width is around 10 µm and this defines the maximum feature size. However, it is the gaps between fibres which the tip detects: in this case the typical feature size is around 5 fibre diameters (50-µm).

A MathCad model suggests that with a smooth tip, the output frequency spectrum will be:

$$P(f) = Af^2 e^{-2fl}$$

where l is the typical fibre to fibre distance.

Where the typical tip feature size is less than or much larger than the feature size, this spectrum is independent of tip surface.

Only using a tip with monodisperse roughness similar to the fibre size increases the high frequency content of the spectrum.

For a 30µ typical feature size the bulk of the spectral power is in the 1–3 Hz region. There is no useful spectral power above 5 kHz.

Experimental results cam be summarised as follows:

The signal frequency and power response is optimised for a 30µ typical surface feature size. In this case the original power is around 16 dBV higher than that produced by a smooth tip (an increase of 40 times).

A coarse (30µ) tip gives larger higher frequency components.

The rms signal power rises by a factor of 3.2 for an increase in speed by factor 3.7 i.e. the rms power is roughly proportional to writing speed.

The drag remains roughly constant regardless of writing speed. The work done against the drag is drag multiplied by velocity, so we would expect the sensor output power to rise linearly with velocity).

The signal power is non-linear with applied load. An increase in load of 1.3× resulted in 3.2× increase in rms sensor output power. This exponential rise may be due to the tip pressing further into the paper surface (according to the model the fibre density increases exponentially with depth into the paper). This suggest that a sharper tip, giving higher pressure for the some writing load, will give higher signal output power.

The tip should therefore be as sharp and rough as possible without excessive degradation in 'feel'. A reduction of dip radius to around 100 µm (similar to the ball in a Pentel) should be achievable, although such a tip would have to life tested for increased wear.

The "feel" of the sensor as it moves across the paper, whilst of no technical interest, could be of much commercial importance, since it adds towards the market acceptability of the pen. "Feel" may be split down into three subjective judgements made about the sensor:

Vibration—do the fingers detect vibration in the pen as it moves?

Scratching—is the sensor tearing the paper fibres?

Noise—does the sensor sound as though it is rough?

Scratching is the worst effect and it occurs when small radii of curvature are present on the sensor tip. In these areas the applied writing force is translated into a large pressure which punctures the paper surface and causes a harsh stick-slip motion, as might be expected when a needle is moved across paper. (The worst case is when the radius of curvature is less than or equal to the typical surface fibre—to fibre distance (c. 15 µm typically), so that the tip digs into the surface). Subjectively the effect is the combination of stick-slip motion detected by the fingers with the scratching noise. Thus, overall tip radii must be greater than 50 µm to avoid tearing.

The frequency limit due to reaction times in generalised nerve cells is around 1000 pulses per second; it is therefore not unreasonable to expect the vibration of frequency in excess of 1 kHz will not be detected as vibration by generalised nerve cells (of course the cells within the ear show substantially different frequency response, since they are specialised for this purpose). Tests on two 'typical' individuals show that subjective roughness is related to the typical feature size of the tip. Sizes less than 15 µm on this scale appear to give an acceptable 'silky' feel whereas particle sizes greater than may give a stick-slip motion.

Grains less than 15 µm diameter should give acceptable 'feel', but there is clearly a compromise necessary and therefore the tip employed has grains approximately in a range of 15–40 micrometers with an optimum size of about 30 µm size and the tip has a diameter of around 500 µm (see FIGS. 6A & 6B).

The detailed construction of the sensor will now be discussed with regard to FIGS. 4 to 8.

The sensor 40 provides for a natural control of ink delivery during writing, causing the ink to flow when the user wants to write. This thus gives an acceptable "feel" when writing. The sensor has to be sufficiently robust to resist damage, for example, when the instrument is dropped accidentally, and must be capable of operating over a wide range of papers, hand pressures, writing speeds, writing angles, etc. Further commercial requirements are: low cost, small size, immunity to electrical and mechanical interference, and low power consumption.

A writing speed of 30–150 mm.s$^{-1}$ is a typical range of speeds which needs to be accommodated together with a writing force of 30–300 g. The sensor should provide an perceived stiffness comparable with a ballpoint pen.

The essential function of the sensor is to provide a signal to the pen's control electronics to switch on the ink jet mechanism when 'writing' is taking place. 'Writing' consists of certain specific conditions and so the ink jet must be switched on only when they are met as follows:

the pen is in contact with the paper and moving across it in any direction;

the pen comes into contact with the paper without moving across it (as in a full stop).

If the pen is in contact with the paper but not moving the ink jet must be switched off, otherwise the result would be continual ink supply to a single point.

A vibration sensor was identified as the best method of achieving these requirements in a unit with relatively simple signal processing.

If a stylus is drawn across paper (which on a microscopic scale is a rough surface) vibration is produced in three mutually perpendicular directions, two of which are parallel to the paper and at 90° to each other, the third is the vertical component, perpendicular to the paper. The sensor of this invention responds to the vibration component in the vertical direction which has two specific advantages:

it responds equally to vibrations produced by travel in any direction across the paper;

it allows a very compact sensor design.

The sensor 40 was designed to occupy the otherwise unused space below the substrate 21 and between the contact areas.

The sensor mechanism consists of a metal beam 41 (supported at one end, with a stylus or tip 42 at the other end) with a piezoelectric strip 43 bonded to it. The beam and piezoelectric strip bend in response to the vibration signals from the paper.

The size and shape of the elements of the sensor are governed by the following:

the space in the available volume, described above;

the need to provide sufficient signal strength for the electronic control system to process it without unreasonable need for very high sensitivity;

to be sufficiently stiff to give the pen the correct 'feel'. This should not feel in any way soft and so require an awkward writing action. The following graph shows the measured load/deflection characteristic of the beam/piezo.

to be sufficiently robust to withstand heavy writing pressure or inadvertent impact (within reasonable limits).

As a force is applied at the stylus 42, a bending moment is produced in the beam 41 and increases linearly along its length. The bending moment produces strain in the beam and piezoelectric strip. The piezo 43 is manufactured with characteristics such that, when it is subjected to strain of this type, an electrical signal (voltage) is generated across its faces. These two faces have electrodes on them allowing electrical connection, via a coaxial cable, to the control electronics.

The steel beam 41 is an integral part of a larger steel plate 44 in order to facilitate mounting in the pen and making electrical connections. The plate 44 has a rectangular aperture 45 through which the ink jets pass from the nozzles in use. The details of sensor construction and electrical connection are described further below.

The stylus or tip 42 is the part of the pen which makes contact with the paper writing surface and has to exhibit the following characteristics:

shape and surface texture to provide the best combination of electrical signal (strength and frequency range) and quality of feel to the user. (is it is detrimental if the sensor is excessively noisy or scratchy).

durability to withstand the very high distance it must travel throughout its life without excessive wear.

The choice of material for the stylus 42 was determined by identifying a material with good wear characteristics without incurring high component cost. Alumina from was chosen to provide a stylus which can be manufactured very cost effectively.

It was determined by testing that the human hand is sensitive to vibrations of less than 1000 Hz and so one objective of the stylus design work was to maximise the energy above 1000 Hz, in order to make the writing action of the pen feel as smooth as possible. A benefit of ceramic tips is that they tend to exhibit more energy above 1000 Hz than say a steel stylus would.

The sensor assembly plate 44, on which the sensor is situated, is a small rectangular plate that is located between the two halves of the casework (see later section on casework). The piezoelectric transducer is of a simple arrangement with electrodes on both faces. One face of the piezoelectric strip is bonded to the beam with a low viscosity epoxy in such a way that there is electrical contact through the adhesive layer via asperities in the surface roughness of the plate and piezoelectric material. With this arrangement the plate forms part of the electrical circuit to the piezoelectric strip.

The stylus or tip 42 consists of an alumina tip 42' bonded into a brass body 42" which is rivetted into the end of the beam (see FIGS. 6A & 6B).

The piezoelectric strip is of dimensions and arrangement shown earlier in FIG. 4 and is manufactured in a lead zirconate titanate grade similar to PZT5A. The sensor beam is manufactured by blanking from sheet metal such as nickel plated spring steel (400–450 VPN). The stylus or sensor tip has a main body which is a small turned component and could be manufactured in a variety of materials. Brass is preferred for its low cost, ease of machining and suitability for rivetting. The stylus or sensor tip has an end formed of alumina in order to provide the necessary wear characteristic as described earlier. It should be possible to manufacture it by pressing and firing in such a way that its shape and surface roughness are as required.

Figure 7:
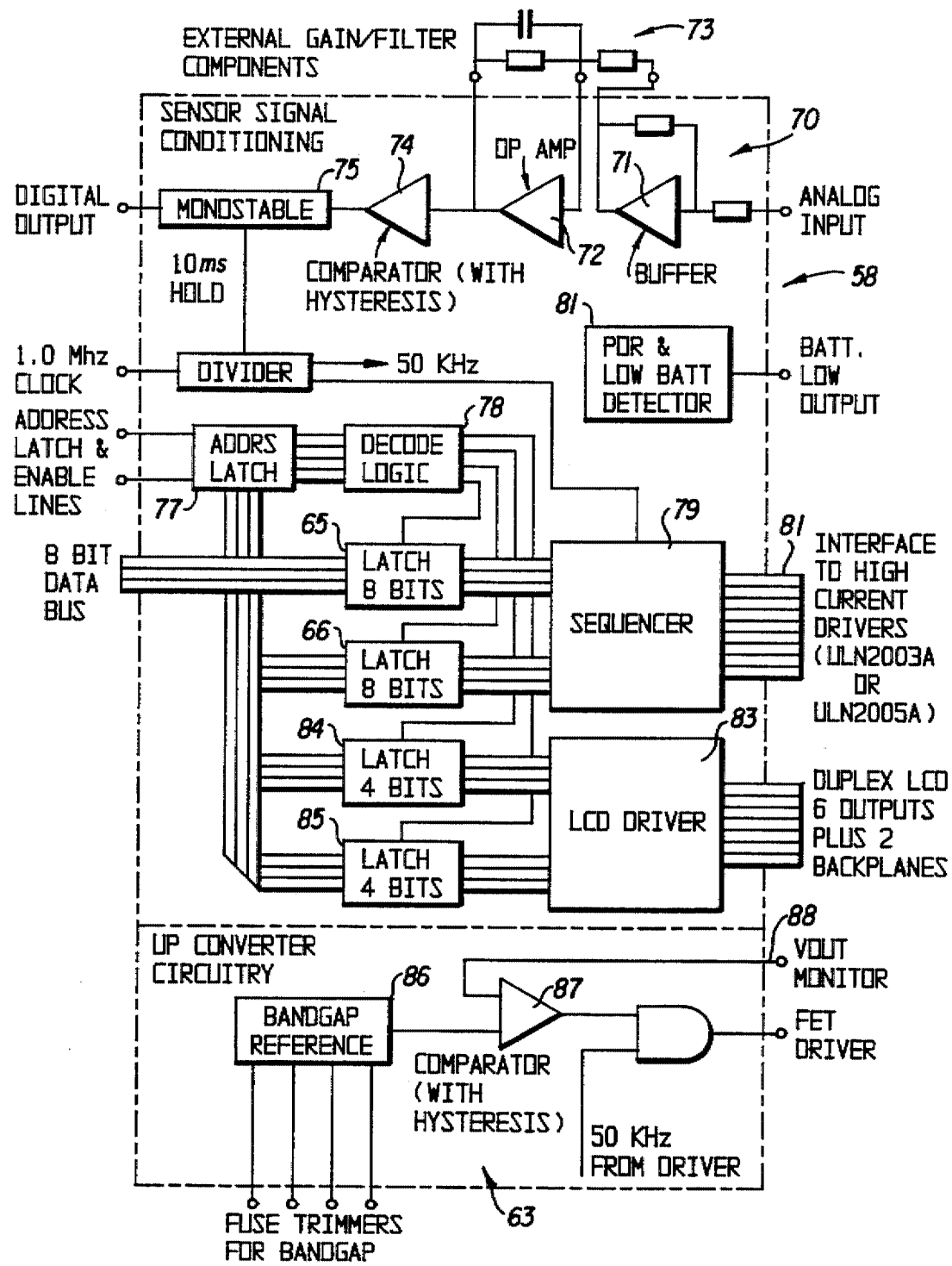
FIG. 7 is are block circuit diagrams of the electronic components for operating the third sensor; and, FIG. 8 is a waveform diagram showing filtering of the sensor signal.

FIG. 7 shows an ASIC which forms part of an electronic control system for a marker pen (as described in more detail in our copending application mentioned above). The ASIC has a signal conditioning circuit 70 which consists of an input buffer 71, an amplifier 72 with external components 73, a comparator 74 and a monostable block 75.

A high impedance input buffer 71 is necessary as the vibration sensor is itself a high impedance capacitive source of the order of 1 nF. When combined with the input impedance of 480 kΩ the sensor gives a high pass filter with a 3 dB frequency of 330 kHz. The signal of interest produced by the vibration sensor is between 1 kHz and 5 kHz of approximately 1.5V peak to peak amplitude.

The buffered and referenced signal is then amplified by a factor of approximately 3. The amplifier 72 has some further low pass filtering and a high pass filter to limit the signal bandwidth to the frequency of interest. The low 3 dB frequency is at 1 kHz which suppresses the phenomenon of "bounce" at the start and end of a line or pattern. It is believed that bounce is caused by the very large offset voltage produced when the user first contacts the paper and finally lifts off. This voltage consists of low frequency components and can be attenuated by the high pass filtering mentioned above. The high frequency cut-off frequency of 5 kHz is present to minimizes the effects of any spurious signals or interference from electrical noise, which may cause the pen to eject ink inadvertently. The filter characteristics of the amplifier 72 are shown in FIG. 8.

The output of the amplifier 72 is fed to a comparator 74 with hysteresis of 100 mV. This relatively high hysteresis is used to reduce the possibility of false triggering. The signal which is by now digital, is presented to a monostable block 75 which is implemented digitally. The monostable 75 is retriggerable and maintains an active output for 10 ms upon each trigger which prevents the output signal from "dropping out" if the vibration sensor signal is not present for short periods. This usually occurs when the stylus moves slowly across the writing surface. The time must not be too long otherwise the pen will continue to deposit ink after the stylus has stopped moving or is no longer in contact with the surface. Setting the monostable time delay too long is manifested by "tails" appearing at the end of words when writing. The output of the monostable is connected directly to the microcontroller 57 which controls the ink jetting process during use.

We claim:

1. A hand-held device comprising: a movement sensor for sensing movement of the device across a surface, the sensor including a sensor tip for application to the surface and adapted to vibrate in response to movement of the tip across said surface in any direction;

transducer means;

means for transmitting the vibrations from the sensor tip to the transducer means, transducer means electrically detecting the resulting vibrations as movement occurs and producing an output signal; and means for filtering the output signal below about 1000 Hz and producing a movement signal indicative of movement of the tip across said surface when the output signal lies above about 1000 Hz, said movement signal controlling the hand-held device when the sensor tip is in moving contact with respect to the surface.

2. A movement sensor according to claim 1, further comprising means for filtering the output signal below and above respective predetermined frequencies and producing a movement detection signal when the output signal lies between the predetermined frequencies.

3. A movement sensor according to claim 1, further comprising means for filtering the output signal below 1000 Hz and producing a movement detection signal when the output signal lies above 1000 Hz.

4. The hand-held device according to claim 1, wherein the transducer means includes a piezoelectric transducer.

5. The hand-held device according to claim 4, wherein the transducer means includes an arm on one end of which is mounted the sensor tip, the piezoelectric transducer being mounted on the arm so as to sense changes in strain on the arm and thus vibration of the sensor tip.

6. The hand-held device according to claim 5, wherein the piezoelectric transducer is elongate and extends along the arm.

7. The hand-held device according to claim 1, adapted to sense contact between the device and the surface, before movement of the device over the surface.

8. The hand-held device according to claim 1, which includes means for detecting the speed of movement of the sensor over the surface.

9. The hand-held device according to claim 1, wherein the vibrations are detected by a microphone constituting the transducer.

10. The hand-held device according to claim 9, wherein an accoustic waveguide is used to direct the air vibrations to the microphone from a means for supporting the process device in contact with a surface relative to which the device is to be moved.

11. The hand-held device according to claim 1, wherein the tip has a surface comprising particles of an average grain size of between 15 and 40 μm.

12. The hand-held device according to claim 11, wherein the tip has a curved surface having a radius of about 250 μm.

13. The hand-held device according to claim 1 further comprising means for detecting the speed of the movement of the sensor tip over the surface.

14. A movement sensor for controlling a hand-held device in response to movement of the device across a surface, the sensor comprising:

a vibratorily mounted sensor tip for application to the surface and vibrating in response to movement of the tip across said surface in any direction;

transducer means;

means for transmitting the vibrations from the sensor tip to the transducer means, the transducer means electrically detecting the resulting vibrations as movement occurs and producing an output signal;

means for filtering the output signal below about 1000 Hz and producing a signal representing movement of the tip across said surface when the output signal lies above about 1000 Hz; and means for detecting the speed of movement of the sensor tip over the surface.

* * * * *